United States Patent Office 3,534,077
Patented Oct. 13, 1970

---

3,534,077
BIS(TRI - n - BUTYL TIN)SULFOSALICYLATE AND TRIBUTYLTIN SALTS OF ETHYLENE DIAMINE TETRACETIC ACID
Michael E. Lombardo, Mananuet, N.Y., assignor, by mesne assignments, to Perry B. Hudson, New City, N.Y.
No Drawing. Continuation of application Ser. No. 310,857, Sept. 23, 1963, which is a continuation-in-part of applications Ser. No. 30,454 and Ser. No. 30,455, May 20, 1960. This application Dec. 24, 1968, Ser. No. 788,689
Int. Cl. C07f 7/22
U.S. Cl. 260—429.7     3 Claims

ABSTRACT OF THE DISCLOSURE

Novel compositions of tri-n-butyl tin derivatives are disclosed as biocides.

---

This application is a continuation of abandoned application 310,857 filed Sept. 23, 1963, now abandoned which was a continuation in part of abandoned applications 30,454 and 30,455, filed May 20, 1960.

This invention relates to antimicrobial compositions and their use in the control of bacteria and fungi.

In the past, organic compounds such as, phenolics, mercurials and low molecular weight alcohols have been used to decontaminate a surface. However, these materials, while providing an initial decontamination of the treated surface, do not impart a residual microbicidal action. As a result, prior decontaminating agents have the serious defect of requiring constant application, or if this is not possible, as is the situation in most circumstances, the treated material becomes recontaminated. A degree of residual or long-term activity has been achieved with the advent of the use of tri-butyl-tin compounds, particularly tri-butyl-tin oxide, (TBTO). However, TBTO is limited in its usefulness in that for many applications, the environmental conditions associated with normal usage, effect a degradation of the compound. Also, TBTO has an objectional odor.

It is an object of this invention to provide a stable microbicidal composition which effects a residual (long-term) microbial decontamination of an environment.

The organotin compounds of this invention have the following general formula:

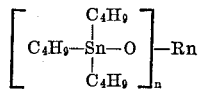

wherein R represents an acyl moiety and wherein $n$ is an integer from 1 to 4. When R is a monobasic acid $n$ equals 1, $n$ equals 2 when R is a dibasic acid, etc.

The following compounds are illustrative of the organotin compounds coming within this invention:

Bis(tri-n-butyltin) sulfosalicylate
Tetra(tri-n-butyltin) ethylenediaminetetraacetate The organotin compounds of this invention may be prepared by reacting the organic acid with bis(tri-n-butyltin) oxide. The oxide serves as a solvent for the organic acid and, in fact, the acid is highly soluble in the oxide. The reaction takes place as the acid goes into solution to produce the acid derivative in good yield.

Following are examples which illustrate the preparation of various organo-tin compounds of the subject invention.

EXAMPLE I

Bis(tri-n-butyltin)sulfosalicylate $(C_4H_9)_3SnO \cdot SO_2 \cdot C_6H_3(OH) \cdot CO \cdot OSn(C_4H_9)_3$, $(C_{31}H_{58}O_6SSn_2)$ 6.93 parts of sulfosalicyclic acid were added directly to 16.26 parts bis(tri-n-butyltin) oxide. The reaction mixture was heated with stirring to 125–130° C. and kept at that temperature for 2½ hours. Initially, there was evolution of water vapor as evidenced by vigorous bubbling and condensation of water vapor on the walls of the beaker. On cooling to room temperature, the product was solidified to a hard plastic-like solid. The latter was ground in a motar and washed with acetone. The yield was 20.08 parts or 92.4% of the theoretical. M.P. 149–153° C. (corr.).

For $C_{31}H_{58}O_6SSn_2$.—Found (percent): C, 46.62; H, 7.54; Sn, 29.91. Calculated (percent): C, 46.76; H, 7.34; Sn, 29.82.

EXAMPLE II

Tetra(tri-n-butyltin) ethylenediaminetetracetate)

$(C_{58}H_{120}O_8N_2Sn_4)$, $(C_4H_9)_3SnOCOCH_2$ \ / $CH_2COOSn(C_4H_9)_3$
    NCH$_2$CH$_2$N
$(C_4H_9)_3SnOCOCH_2$ / \ $CH_2COOSn(C_4H_9)_3$ 3.98 parts of ethylenediaminetetracetic acid were added directly to 16.26 parts bis(tri-n-butyltin) oxide. The temperature of the reaction mixture was brought up to 110° C. with stirring for 10 minutes, complete solution occurred. On cooling to 68.5° C., the reaction mixture solidified. The product was recrystallized from absolute ethyl alcohol and acetone. The first crop of crystals represented 60.1% of the theoretical yield. M.P. 117–119° C. (corr.).

For $C_{58}H_{120}O_8N_2Sn_4$.—Found (percent): C, 48.11; H, 8.25; Sn, 32.74. Calculated (percent): C, 48.09; H, 8.35; Sn, 32.78.

Formulation

| | Percent by weight |
|---|---|
| Bis(tri-n-butyltin)sulfosalicylate | 99.0 |
| Inert ingredients | 1.0 |

The above formulation is useful in treating plastic compounds, plastic films and rubber products to render treated products actively and permanently antimicrobial.

I have found that employing a plurality of organo tins of this invention results in a composition having a synergistic microbicidal action. Moreover, by employing a combination of organo tins an environment may be decontaminated though applying lesser amounts of organo tins having (relative to other organo tins of this invention) higher toxicity. Additionally, compatibility problems present in the formulation of a single organo tin of sufficient quantity to decontaminate, may be alleviated by utilizing a plurality of organo tin compounds. For example, a particular compound, in the concentration required, may be insoluble, in which case the amount may be reduced and the activity maintained by replacement with a more soluble compound.

*Procedure.*—Prepare a use dilution of the germicide to be tested in sufficient quantity to completely immerse a rack containing 50 slides. The slides are immersed in the test medicant for one minute and all the excess drained off. When testing pressurized spray disinfectants, the slides are sprayed at a predetermined distance and for a set time (10 to 12 inches for 5 seconds). Four series of 50 slides each are treated and dried as follows:

(1) Thirty minutes at 37° C.;
(2) Twenty-four hours at 37° C.;
(3) One week at room temperature; and
(4) One month at room temperature.

Following the drying periods prescribed above, the slides in each series are inoculated at 10 second intervals with a loop of a 48 hour culture of the test organism. A series of 50 positive control slides is also inoculated. The entire set of 50 slides is inoculated within a 10 minute period. Each series of 50 slides is subdivided into 5 groups of 10 slides per group to permit the following contact periods of inoculum with treated and positive control slides:

(1) Ten minutes
(2) Thirty minutes
(3) One hour
(4) Four hours;
(5) Twenty-four hours.

In addition, five negative controls (no medicant and no inoculum) are run simultaneously.

The slides are placed into 6 ounce jars containing 25 ml. of letheen broth and swirled for 30 seconds. The transfer is accomplished by using sterile, flamed forceps. Aliquots of one and one-tenth milliliters are removed for plate counts from each jar. Higher dilutions are made in the case of positive control jars. Both jars and plates are incubated at 37° C. and observations are made after 24 and 48 hours.

Negative jars indicate residual bactericidal activity. In the case of positive jars, evaluation must be based on plate counts as compared to the positive control. All positive jars should be confirmed by gram stain.

Following the procedure previously outlined, the residual antibacterial activity of the selected germicides was determined. Table I is a summary of the residual data expressed as the average number of organisms per milliliter of broth in the jars containing the test slides. Each figure is the average of 10 determinations. Table II presents data on the percentage of jars which showed positive bacterial growth after 48 hours incubation.

Zero, or very low bacterial counts (See Table I) accompanied by absence of bacterial growth in the jars after incubation (See Table II) indicates residual bactericidal activity of the germicide. Zero, or very low bacterial counts (Table I) accompanied by positive bacterial growth in the jars after incubation (Table II) demonstrates residual bacteriostatic activity. High bacterial counts (Table I) accompanied by positive bacterial growth in the jars (Table II) shows complete absence of residual antibacterial activity.

What is claimed is:
1. Tetra(tri-n-butyltin) ethylene diamine tetraacetate.
2. Bis(tri-n-butyltin) sulfosalicylate.
3. A tri-n-butyl tin salt of ethylene diamine tetra acetic acid.

No references cited.

TOBIAS E. LEVOW, Primary Examiner
W. F. W. BELLANY, Assistant Examiner

U.S. Cl. X.R.
424—288